UNITED STATES PATENT OFFICE.

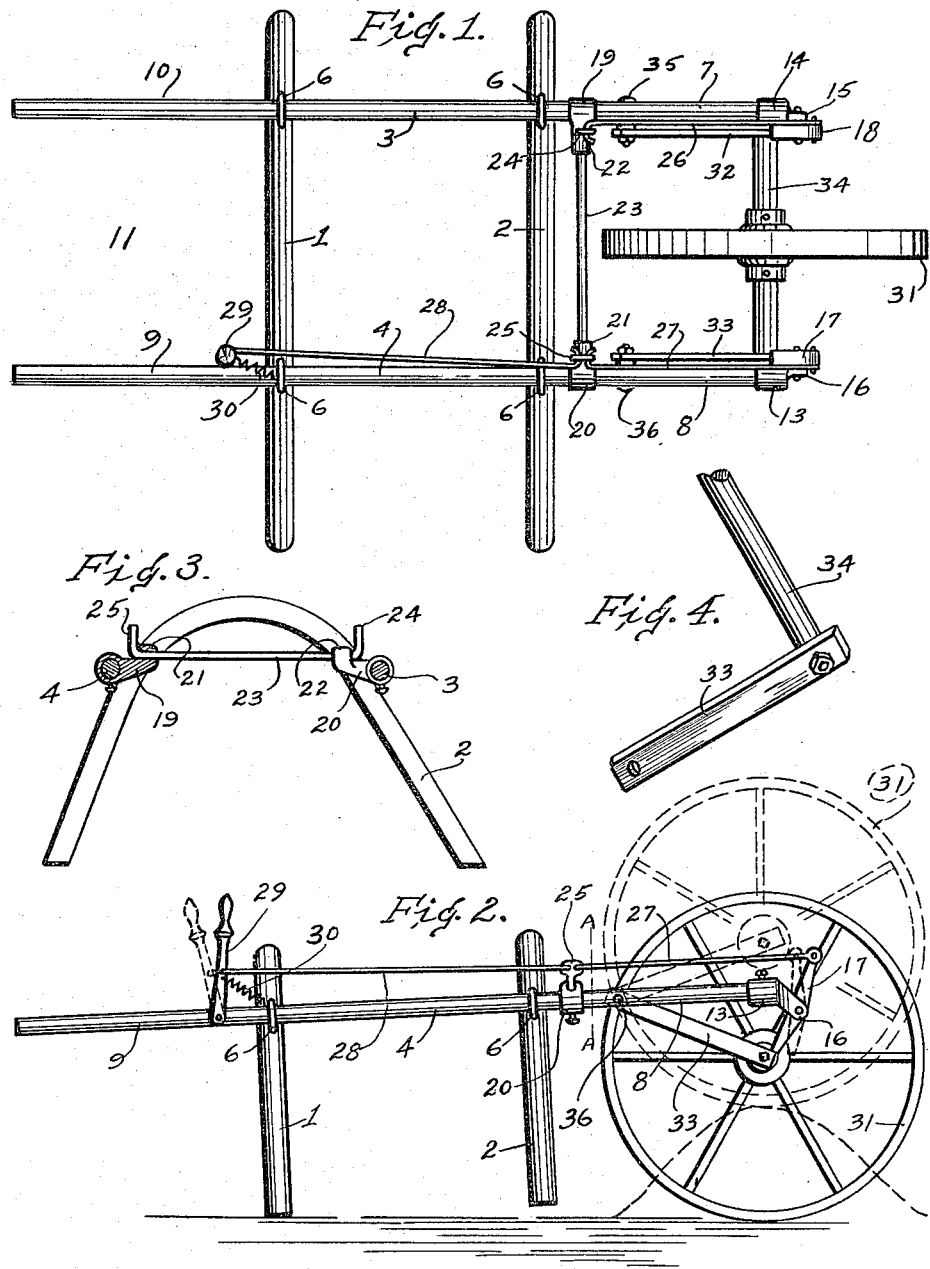

WILLIAM W. LEACH, OF PINELAND, TEXAS.

TRANSPORTING-TRUCK.

1,176,375.　　　　　Specification of Letters Patent.　　Patented Mar. 21, 1916.

Application filed September 24, 1914. Serial No. 863,258.

*To all whom it may concern:*

Be it known that I, WILLIAM W. LEACH, citizen of the United States of America, residing at Pineland, in the county of Sabine and State of Texas, have invented certain new and useful Improvements in Transporting-Trucks, of which the following is a specification.

This invention relates to certain new and useful improvements in transporting trucks for agricultural implements or the like, and while shown and described in connection with the frame of a stump borer, it will be understood that its use is not confined thereto, but can be extended to all implements or machines of a transportable type.

The primary object of the invention is to provide a truck which can be operated by one man and also to provide means which can be manipulated so as to throw a transporting wheel into and out of engagement with the ground so as to enable transporting of the machine when the wheel is on the ground, and to enable the wheel to be moved out of engagement with the ground to thereby allow the machine to solidly rest upon the ground after transportation.

A further object of the invention is to provide means for positively locking the wheel in ground engaging position and for also enabling the locking means to be disengaged to thereby allow the frame to move down to engage the ground.

Further the invention aims to provide means whereby upon tilting of the frame to partially raise same from the ground, the transporting wheel will be automatically locked in ground engaging position.

In the drawings: Figure 1 is a top plan view of the invention; Fig. 2 is a side elevation showing the wheel of the truck in contact with the earth, in full lines, for transporting purposes and the wheel forced to swing upward when released from the frame to the position shown in dotted lines when it encounters an obstruction in the earth; Fig. 3 is a section on the line A—A of Fig. 2; and Fig. 4 is a detail perspective view of a portion of the yoke.

The present illustration of the invention is shown in connection with the frame of a stump boring machine which includes a pair of transverse inverted U-bars or uprights 1 and 2, secured to a pair of longitudinal bars 3 and 4 by means of clips 6, the bars 3 and 4 extending beyond the uprights 1 and 2 as clearly shown in the drawings. Brackets 13 and 14 are secured to the ends 7 and 8 of the bars 3 and 4, and are provided with depending arms 15 and 16 respectively. Locking levers 17 and 18 are pivoted to the arms 15 and 16 respectively, at points intermediate the ends of the bars 17 and 18.

The bars 3 and 4 have brackets 19 and 20 respectively secured thereto, the brackets having eyes or bearings 21 and 22 in which latter a transverse shaft 23 is journaled, the ends of the shaft being turned at right angles to provide cranks 24 and 25.

For the purpose of operating the pivoted locking levers 17 and 18 from the shaft 23 links 26 and 27 are pivotally connected to the upper ends of the levers 17 and 18 and to the cranks 24 and 25 respectively of the shaft 23, by which means, operation of the shaft 23 will be communicated to both of the links 26 and 27 and thereby to the levers 17 and 18, simultaneously.

For the purpose of rocking or operating the shaft 23, an operating link 28 is pivoted at one end to the crank 25 and at its opposite end to a hand operated lever 29 which latter is pivoted to the end portion 9 of the bar 4 and is tensioned by a coil spring 30, which latter acts to normally hold the parts in their locked position shown in full lines in Fig. 2.

The transporting wheel 31 is mounted upon a yoke which consists of the side bars 32 and 33 which support the axle 34 at one of their ends and at their opposite ends are pivotally attached by the bolts 35 and 36 to the end portions 7 and 8 of the bars 3 and 4. The yoke normally could be moved upwardly and downwardly with respect to the ends 7 and 8 of the bars 3 and 4, but with use of the hereinabove described mechanism, the movement of the yoke is restricted or controlled by such mechanism.

In operation, it will be seen that the locking levers 17 and 18 are normally held by the spring with their lower ends in position to engage the upper sides of the yoke side bars 32 and 33 when the frame is tilted upwardly at its front, and when engaged with the yoke sides as shown in full lines on Fig. 2, the levers 17 and 18 prevent upward movement of the yoke and therewith the transporting wheel 31 and thus allow the structure to be transported. The spring 30 exerts tension on the link 28 and therethrough the shaft 23 and links 27 and 28 to hold the levers 17 and 18 in their just mentioned locking positions. In transporting the structure, the operator stands in the space 11 and grasps the ends 9 and 10 of the bars 3 and 4 thus utilizing the latter as handles, and moves the device similar to the action in moving a wheel-barrow. When the machine has been transported to the desired location and the operator desires to again allow the machine to rest upon the legs of the frame, which legs are provided by the lower ends of the bars 1 and 2, the lever 29 is pulled rearwardly against the action of the spring 30 to the dotted line position shown in Fig. 2 thereby withdrawing the lower ends of the locking levers 17 and 18 from engagement with the yoke sides 32 and 33 into the dotted line position shown in Fig. 2, thereby releasing the wheel 31 and yoke and allowing them to pivot and be moved to the dotted line position shown in Fig. 2 upon encountering an obstruction in the earth thereby permitting the stump boring machine to be placed adjacent or in close proximity to the stump to be bored.

It will be noted that upon tilting of the frame at its front, the levers 17 and 18 are in the path of the yoke sides 32 and 33 and the latter move the levers outwardly at and by engaging the lower ends thereof so that when the frame is lowered, the levers will engage the yoke sides and hold the frame bar 2 in the up position shown in full lines in Fig. 2. The locking action is thus automatic, since by merely raising the front end of the frame from the ground, the levers 17 and 18 act to automatically lock the carrier in position when the wheel of same is in ground engaging position.

What is claimed is:

1. In combination with the frame of a transportable implement, a yoke pivoted to the frame, a ground engaging wheel on the yoke, a rock shaft on the frame, cranks on the rock shaft, links connected to the cranks, locking levers pivoted to the frame and engageable at their lower ends with the upper faces of the sides of the yoke, said links being also connected to the locking levers, a spring tensioned hand operating lever pivoted to the frame, and a link connected to the last named lever and to one of the cranks of the rock shaft.

2. In combination with the frame of a transportable implement, a wheel carrier pivotally connected to the frame so as to be movable into and out of ground engaging positions, means comprising swinging pawls automatically co-acting with the carrier to lock the carrier to the frame when the wheel is in ground engaging position and a lever and link mechanism to operate the pawls.

3. In combination with the frame of a transportable implement, a wheel carrier pivotally connected to the frame so as to be movable into and out of ground engaging positions, means comprising swinging pawls to automatically lock the carrier to the frame when the wheel is in ground engaging position and when the frame is partially raised from the ground, and a lever and link mechanism to release the pulleys from the carrier.

4. In combination with the frame of a transportable implement, a yoke shaped wheel carrier pivotally connected to the frame so as to be movable into and out of ground engaging positions, means comprising swinging pawls automatically operative to lock the carrier to the frame when the wheel is in ground engaging position, means to positively retain the locking means in locking position, and manually controlled means to release the locking means.

5. In combination with the frame of a transportable implement, a wheel carrier pivotally connected to the frame to swing above and below the plane of the frame, and movable into and out of ground engaging position, and spring held locking means comprising swinging pawls for the carrier, said locking means being automatically engaged with the carrier and co-acting therewith to hold the wheel in ground engaging position upon tilting of the frame at one end thereof.

6. In combination with the frame of a transporting truck, a wheel carrier pivotally connected to the frame to swing above and below the frame thereof, handles on the frame, and means comprising swinging pawls to enable the carrier to be automatically locked in position when the wheel thereof engages the ground and the frame is tilted.

7. In combination with the frame of a transportable implement, a wheel carrier pivotally connected to the frame, so as to be moved into and out of ground engaging position, means comprising swinging pawls to lock the carrier in ground engaging position and a lever and link mechanism to operate the pawls.

8. In combination with the frame of a transportable implement, a wheel carrier pivotally connected to the frame, means comprising swinging spring pressed pawls to automatically lock the carrier in ground engaging position, and a manually operable link and lever mechanism to release the pawl locking means to enable the wheel of the carrier to be moved out of ground engaging position when an obstruction in the earth is encountered.

In testimony whereof I affix my signature in presence of two witnesses.

WILLIAM W. LEACH.

Witnesses:
D. R. BAXTER,
S. P. MCELROY.